Aug. 14, 1945.  H. M. KENNARD  2,382,639
DRILL GUIDE
Filed June 13, 1944
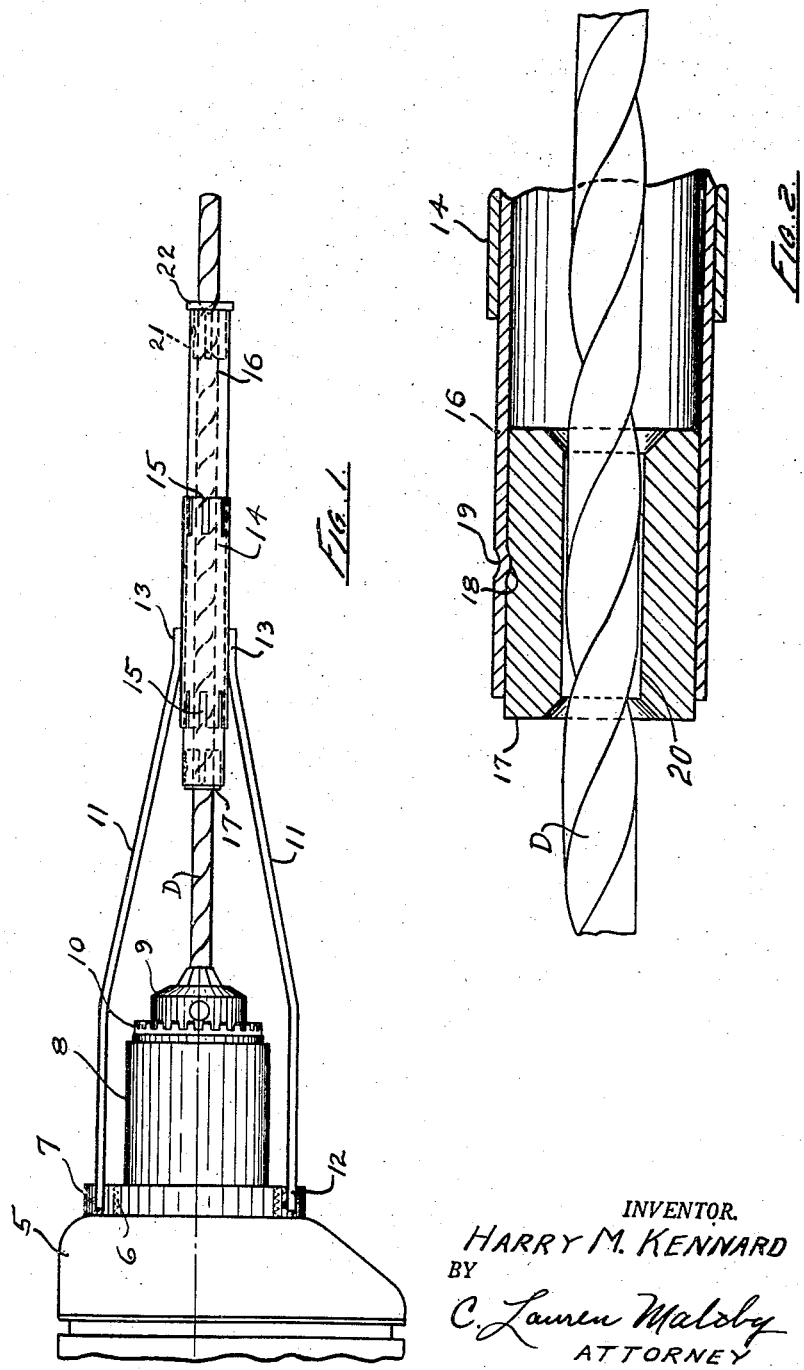
INVENTOR.
HARRY M. KENNARD
BY
C. Lauren Maloby
ATTORNEY Patented Aug. 14, 1945

2,382,639

UNITED STATES PATENT OFFICE 2,382,639

DRILL GUIDE

Harry M. Kennard, Santa Barbara, Calif.

Application June 13, 1944, Serial No. 540,163

5 Claims. (Cl. 77—55)

This invention relates to power tools and more especially to the guide attachment for electric drills and the like.

An object of the invention is to provide a simple, practical and efficient device of the character described.

Another object of the invention is to provide an improved guard attachment for long stem or extension drills whereby to prevent breaking of the drill or buckling of the drill which would cause injury to the operator.

An additional object is to provide a drill stem guard of the character described intended for but not limited to motor driven portable or hand drills.

An additional object is to provide a drill stem guard having extension features wherein the guard is adjustable to drills of different lengths, and may also be extended or retracted as the drill enters the work a considerable distance.

Another object is to provide an extension drill guide having a series of bushings, the bushings having different drill stem bores so that a single guard is capable of handling a variety of sizes of drills.

Other objects and advantages will appear and be brought out more fully in the following specification, reference being had to the accompanying drawing wherein:

Fig. 1 is a side view of the end of a motor driven portable drill showing my invention in connection therewith, and Fig. 2 is a fragmentary view enlarged, showing the sleeve and bushing structure shown in Fig. 1.

Referring more particularly to the drawing I show a drill head 5 of a motor powered drill body such as a hand drill, having a threaded shouldered portion 6 on which is secured a collar 7 by threaded engagement therewith, which when tightened, locks against head 5. The drill spindle is shown at 8 and is provided with a chuck 9 and a gear 10 for a chuck tightening wrench of conventional type.

The guard and drill stem guide constituting my invention comprises a plurality of braces 11 suitably secured at an end 12 thereof to collar 7 as by welded or equivalent connection, and the opposite ends 13 thereof secured as by welding or the like to a tubular member 14 which has the end portions thereof slotted at 15 and sprung inwardly to frictionally engage a sleeve 16 which is slidable therein, however being held in any position by the friction engagement therewith.

A bushing 17 is positioned within and at the inner end of sleeve 16 and held in position by a dimple 18 engaging a boss 19 in sleeve 16. Bushing 17 has a bore 20 slightly larger than the outside diameter of a long stem or extension drill with which the bushing is intended to operate. A similar bushing 21 is similarly secured at the outer end of sleeve 16 and is provided with a flanged end 22 which protects the end of the sleeve and prevents the bushing from being pushed inwardly inadvertently, and also provides a ready means of removing the bushing for replacement with another of different size. Bushing 21 has a bore of the same size as bore 20 of bushing 17.

From the foregoing description it should be clear that a long stem drill D may be chucked in chuck 9 by passing the drill through bores 20 of the bushings, and when operated the bushings, sleeve and tubular member will provide a guide and guard for the drill D and prevent whipping or buckling such that sleeve 16 may be shifted in tubular member 14 by pressure against a work piece so as to guide and guard the central portion of the drill as the distance from the chuck 9 to the work may vary as the drill is advanced into the work piece. It will also be apparent that bushings 17 and 21 may be readily removed and replaced with another pair of bushings having a different sized bore for guiding a drill of different size.

Having thus described my invention, what I claim and desire to secure by Letters Patent is:

1. A drill guide as described for a drill having a body and a chuck spindle comprising: a frame adapted to be secured to said body and having a tubular member secured thereto, and a drill guide sleeve slidably secured in said tubular member in alignment with the spindle axis, said sleeve having a pair of drill guide bushings slidably and detachably secured thereto, at least one of said bushings having a flange to facilitate detachment from said sleeve.

2. A drill guide as described for a drill having a body and a chuck spindle comprising: a frame adapted to be secured to said body and having a tubular member secured thereto, and a drill guide sleeve slidably secured in said tubular member in alignment with the spindle axis, said sleeve having a pair of drill guide bushings slidably and detachably secured thereto, said bushings each having a bore substantially the diameter of a selected drill.

3. In a drill having a body, a spindle, and a threaded collar over said spindle adjacent said body, a drill stem guide comprising: an elongated frame secured to said collar and having a tubular member secured thereto and in spaced relation to said spindle, a sleeve member slidably disposed within said tubular member and having friction engagement therewith, and a pair of drill guide bushings secured to said sleeve adjacent the ends thereof.

4. In a drill having a body, a spindle, and a threaded collar over said spindle adjacent said body a drill stem guide comprising: an elongated frame secured to said collar and having a tubular member secured thereto and in spaced relation to said spindle, a sleeve member slidably disposed within said tubular member and having friction engagement therewith, and a pair of drill guide bushings secured to said sleeve adjacent the ends thereof and means to secure said bushings to said sleeve.

5. In a drill having a body, a spindle, and a threaded collar over said spindle adjacent said body a drill stem guide comprising: an elongated frame secured to said collar and having a tubular member secured thereto and in spaced relation to said spindle, a sleeve member slidably disposed within said tubular member and having friction engagement therewith, a pair of drill guide bushings secured to said sleeve adjacent the ends thereof, and means to secure said bushings to said sleeve, said means including a dimple in each said bushing and a cooperating boss in said sleeve.

HARRY M. KENNARD.